US009060294B2

(12) United States Patent (10) Patent No.: US 9,060,294 B2
Gupta et al. (45) Date of Patent: Jun. 16, 2015

(54) SYSTEM AND METHOD FOR THROTTLING DOWNLINK DATA NOTIFICATIONS IN A NETWORK ENVIRONMENT

(71) Applicant: CISCO TECHNOLOGY, INC., San Jose, CA (US)

(72) Inventors: Pavan Gupta, Pune (IN); Poojan Tanna, Mulund-W Mumbai (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 253 days.

(21) Appl. No.: 13/647,189

(22) Filed: Oct. 8, 2012

(65) Prior Publication Data

US 2014/0101303 A1 Apr. 10, 2014

(51) Int. Cl.
| H04W 68/02 | (2009.01) |
| H04W 28/02 | (2009.01) |
| H04W 68/00 | (2009.01) |
| H04L 12/863 | (2013.01) |
| H04W 4/00 | (2009.01) |
| H04W 80/04 | (2009.01) |

(52) U.S. Cl.
CPC .......... H04W 28/0252 (2013.01); H04L 47/50 (2013.01); H04W 4/005 (2013.01); H04W 80/04 (2013.01); H04W 68/00 (2013.01); H04W 68/02 (2013.01)

(58) Field of Classification Search
CPC .................. H01L 12/56; H01L 12/569; H01L 12/5693–12/5695; H01L 47/00–47/80; H04W 4/005; H04W 28/0252; H04W 68/00; H04W 68/02; H04W 80/04
See application file for complete search history.

(56) References Cited

U.S. PATENT DOCUMENTS

| 8,429,282 | B1 * | 4/2013 | Ahuja et al. ................... 709/229 |
| 8,515,465 | B2 * | 8/2013 | Olsson et al. ................. 455/458 |
| 2006/0045012 | A1 * | 3/2006 | Cherukuri et al. ............. 370/230 |
| 2011/0069615 | A1 * | 3/2011 | Zhang et al. .................. 370/235 |
| 2011/0286465 | A1 | 11/2011 | Koodli et al. |
| 2013/0114408 | A1 * | 5/2013 | Sastry et al. .................. 370/231 |
| 2013/0301558 | A1 * | 11/2013 | Zakrzewski ................. 370/329 |

OTHER PUBLICATIONS

ETSI 3rd Generation Partnership Project (3GPP), "LTE; General Packet Radio Service (GPRS) enhancements for Evolved Universal Terrestrial Radio Access Network (E-UTRAN) access," (3GPP TS 23.401 version 10.8.0 Release 10), ETSI TS 123-401 V10.8.0 (Jul. 2012) Technical Specification, 280 pages.

* cited by examiner

Primary Examiner — Brian J Gillis
Assistant Examiner — Gil H. Lee
(74) Attorney, Agent, or Firm — Patent Capital Group

(57) ABSTRACT

A method is provided in one example embodiment and includes creating an initial sample set comprising a plurality of notification messages, where each of the notification messages is associated with one of a plurality of bearers each of which has a first parameter associated therewith. The method further comprises prioritizing the notification messages of the initial sample set according to a value of the first parameter of the associated bearer to create a prioritized sample set and optimizing the prioritized sample set to create an optimized sample set. The method further comprises applying a throttle factor to the optimized sample to remove a number of low priority notification messages from the prioritized sample set to create a final set of notification messages to be transmitted to a network element.

18 Claims, 4 Drawing Sheets

SYSTEM AND METHOD FOR THROTTLING DOWNLINK DATA NOTIFICATIONS IN A NETWORK ENVIRONMENT

TECHNICAL FIELD

This disclosure relates in general to the field of digital communications and, more particularly, to throttling downlink data notifications in a network environment.

BACKGROUND

Although the data capacity of 3GPP networks has increased significantly since its initial development, user traffic continues to outpace the growth in capacity, resulting in increased network congestion and degraded user service. In particular, the explosion of Internet data traffic, especially the growing portion of the traffic traversing mobile networks, has caused much of the congestion currently being experienced. This explosion is partly attributable to the increase in the number of users using smart phone devices possessing 3G/4G capabilities together with large screens and various Internet applications, such as browsers and video and audio streaming applications. Additionally, laptops and tablets with 3G/4G access capabilities are a major source of mobile data traffic. An annual growth rate of 50% is expected to continue, with growth likely to continue outpacing the increase in infrastructure needed to handle it.

When a serving gateway ("SGW") receives IP packets directed to idle user equipment ("UE"), the SGW can buffer the received packets while it locates the UE. Location of the UE is typically accomplished by directing paging requests toward a mobility management entity ("MME") using a downlink data notification ("DDN") message. As will be recognized, excessive paging of this sort from the SGW can overload the MME and place a strain for radio resources on the eNodeB.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes creating an initial sample set comprising a plurality of notification messages. The messages can be formed of any suitable data segments, information elements, etc. and be provided in any appropriate format. Each of the notification messages is associated with one of a plurality of bearers each of which has a first parameter associated therewith. The parameter can be any suitable identifier, characteristic, element, attribute, property, or quality associated with a bearer. The method further comprises prioritizing the notification messages of the initial sample set according to a value of the first parameter of the associated bearer to create a prioritized sample set and optimizing the prioritized sample set to create an optimized sample set. The term 'optimizing' in such a context includes any activity associated with modifying, changing, enhancing, adjusting, augmenting, or otherwise processing the sample set. The method further comprises applying a throttle factor to the optimized sample to remove a number of low priority notification messages from the prioritized sample set to create a final set of notification messages to be transmitted to a second network element.

In one embodiment, the creating comprises sampling notification messages initiated by the first network element during a predetermined time frame in response to an indication of imminent overload at the second network element. The first parameter may comprise an Allocation and Retention Priority ("ARP") priority level of the associated bearer. The notification messages comprise downlink data notification ("DDN") messages. In certain embodiments, the optimizing comprises eliminating duplicate notification messages such that the optimized sample set contains no more than one notification message for each of the bearers. Additionally, the prioritizing may comprise arranging the notification messages in order of associated ARP priority level value. The first network element may be implemented as a serving gateway; similarly, the second network element may be implemented as a mobile management entity.

Example Embodiments

Figure 1:
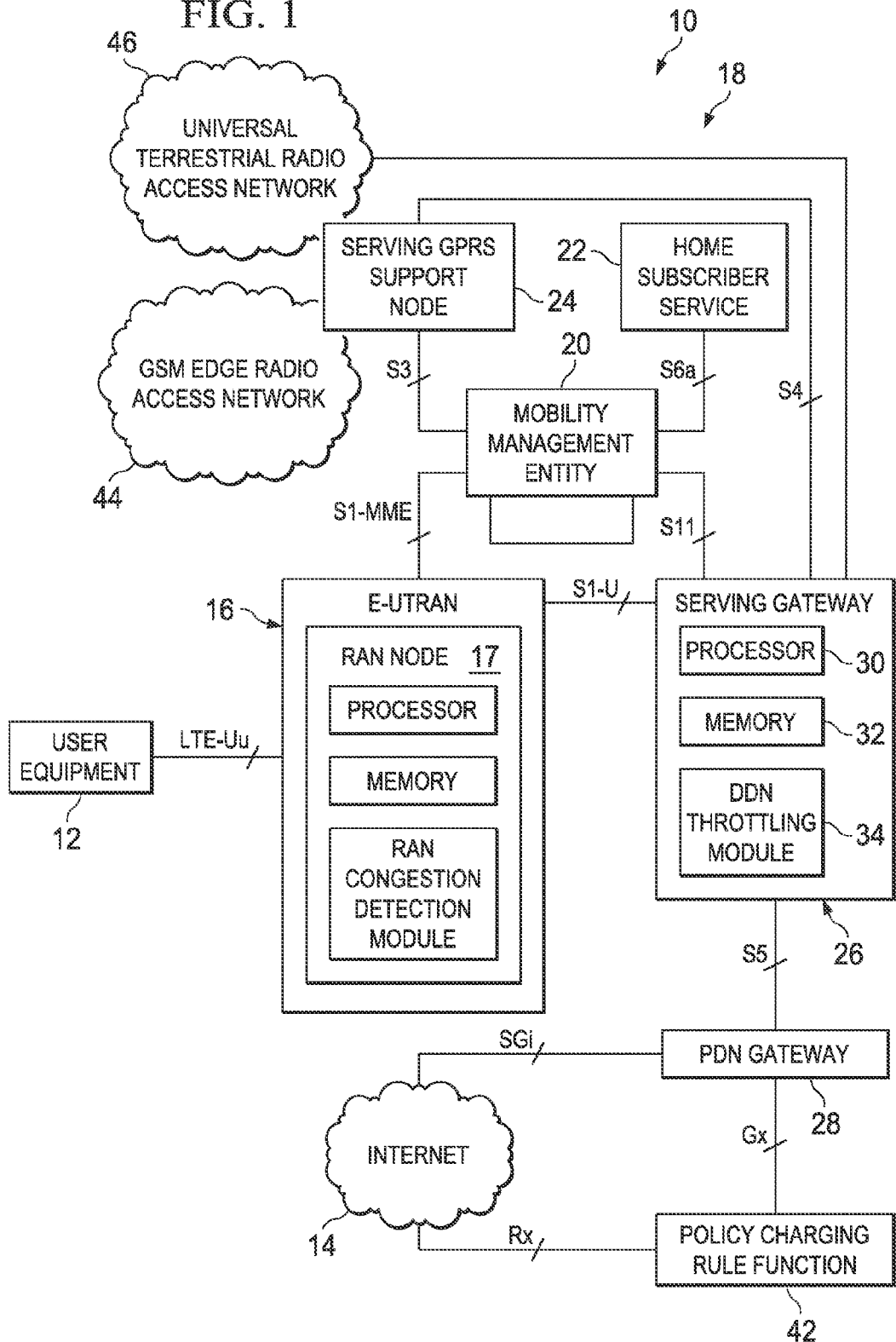
FIG. 1 is a simplified block diagram of a communication system for implementing a method of throttling downlink data notifications in a network environment in accordance with one embodiment of the present disclosure.

Turning to FIG. 1, FIG. 1 is a simplified block diagram of a communication system 10 for implementing a method of throttling downlink data notifications ("DDNs") in a network environment in accordance with one embodiment of the present disclosure. In one embodiment, at least a portion of communication system 10 is implemented as a Long Term Evolution ("LTE") network. As illustrated in FIG. 1, communication system 10 enables one or more user equipment ("UE"), represented in FIG. 1 by UE 12, to be connected to communicate data to and from the Internet 14 via a radio access network ("RAN") 16 comprising a plurality of RAN nodes, represented in FIG. 1 by a RAN node 17, and a core network 18. In one embodiment, RAN 16 is implemented as an E-UTRAN, in which the RAN nodes comprise eNodeBs; however, it will be recognized that RAN 16 may also be implemented using radio network controllers ("RNCs") instead of or in addition to eNodeBs for the RAN nodes. In one embodiment, core network 18 may be implemented using an Evolved Packet Core ("EPC") network as defined in 3GPP TS 23.401 and employing a user plane protocol GTPv1-U. It will be understood, however, that other implementations of core network 18 may be employed in accordance with the features described herein.

As illustrated in FIG. 1, core network 18 may include a mobility management entity ("MME") 20, which is responsible for control plane functions related to subscriber and session management and is connected to a home subscriber service ("HSS") 22, which supports a database that includes user subscription information, through an S6a interface. Core network 18 may further include a serving GPRS support node ("SGSN") 24 connected to MME 20 via an S3 interface for providing functionality related to packet-data switching.

Core network 18 may further include a serving gateway ("SGW") 26, which is the termination point of the user plane interface S1-U toward the RAN network, and a PDN gateway ("PGW") 28, which serves as an interface to the Internet, sending user data from the user toward the Internet and receiving data destined for the user from the Internet. In addition, the PGW supports policy enforcement features that apply operator-defined rules for resource allocation and usage, as well as packet filtering and inspection and charging support. For purposes that will be described in greater detail below, the SGW 26 includes a processor 30, memory 32, and a DDN throttling module 34 for implementing DDN throttling functionality in accordance with features of embodiments described herein. The PGW 28 may interface with a policy charging rule function ("PCRF") 42, which manages the service policy and provides QoS information for each user session. It will be recognized that core network 18 may provide a variety of functionality in communication system 10, including, for example, one or more of aggregation, user authentication, call control and switching, accounting and charging, service invocation, and gateways.

MME 20 also provides the control plane function for mobility between LTE and 2G/3G access networks, such as GSM Edge Radio Access Network ("GERAN") 44 and Universal Terrestrial Radio Access Network ("UTRAN") 46, with the S3 interface, terminating at MME 20 from SGSN 24. GERAN 44 is the radio part of GSM/EDGE together with the network that joins the base stations, or Node Bs, and the base station controllers ("BSCs"). GERAN comprises the core of a GSM network through which phone calls and packet data are routed to and from the PSTN and the Internet to and from UE. A mobile phone operator's network comprises one or more GERANs, coupled with UTRANs, in the case of a UMTS/GSM network. UTRAN refers to the Node B's and that make up the Universal Mobile Telecommunications System ("UMTS") radio access network. UTRAN can carry many traffic types from real-time Circuit Switched to IP based Packet Switched. UTRAN enables connectivity between UE and a core network. UTRAN includes multiple Node Bs and several RNCs, each of which provides control functionalities for one or more Node Bs. A Node B and an RNC can be collocated on a single device; however, they are typically implemented separately, with the RNC disposed in a central location for serving multiple Node Bs. The RNC and its corresponding Node Bs are called the Radio Network Subsystem (RNS). A single UTRAN may include more than one RNS.

As previously noted, in one embodiment, communication system 10 is implemented in accordance with the Long-Term Evolution ("LTE") standard. E-UTRAN provides the radio access in the LTE network and is designed to improve end-user throughputs and sector capacity and reduce user plan latency, bringing significantly improved user experience with full mobility. With the emergence of IP as the protocol of choice for all types of traffic, LTE provides support for IP-based traffic with end-to-end QoS. E-UTRAN supports various types of services, including web browsing, FTP, video streaming, VoIP, online gaming, real time video, push-to-talk, and push-to-view, for example.

UE 12 can be associated with clients, customers, or end users wishing to initiate a communication in communication system 10 via some network. The term "user equipment" is inclusive of devices used to initiate a communication, such as a computer, a personal digital assistant (PDA), a laptop or electronic notebook, a cellular telephone, an iPhone, an IP phone, or any other device, component, element, or object capable of initiating voice, audio, video, media, or data exchanges within communication system 10. UE 12 may also be inclusive of a suitable interface to the human user, such as a microphone, a display, or a keyboard or other terminal equipment. UE 12 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. On power up, UE 12 can be configured to initiate a request for a connection with a service provider. A user agreement can be authenticated by the service provider based on various service provider credentials (e.g., subscriber identity module ("SIM"), Universal SIM ("USIM"), certifications, etc.). More specifically, a device can be authenticated by the service provider using some predetermined financial relationship.

In general terms, SGW 26 is associated with an SGSN user plane in an IP network. SGW 26 can be configured to route and to forward user data packets, while also acting as the mobility anchor for the user plane during inter-Node B handovers. Additionally, SGW 26 can act as the anchor for mobility between LTE and other 3GPP technologies (i.e., terminating the S4 interface and relaying the traffic between 2G/3G systems and PGW 28 via the S5 interface). For idle-state, versus active-state, UEs, SGW 26 can terminate the data path and trigger paging when data arrives for UE 12. SGW 26 can also manage and store UE contexts (e.g., parameters of the IP bearer service, network internal routing information, etc.). SGW 26 can also perform replication of user traffic in case of lawful interception.

MME 20 can be configured to operate as a control node for the LTE access-network. It further can be responsible for idle mode UE tracking and paging procedures (including, for example, retransmissions). Furthermore, MME 20 can be involved in the bearer activation/deactivation process and can be responsible for choosing SGW 26 for UE 12 at the initial attach (and at time of an intra-LTE handover involving core network node relocation). MME 20 can also be responsible for authenticating the user by interacting with HSS 22. MME 20 also provides the control plane function for mobility between LTE and 2G/3G access networks, such as GSM Edge Radio Access Network ("GERAN") 44 and Universal Terrestrial Radio Access Network ("UTRAN") 46, with the S3 interface, terminating at MME 20 from SGSN 24. MME 20 also terminates an S6a interface toward the home HSS for roaming UEs.

Other functions of MME 20 may include generating and allocating temporary identities to UEs, terminating Non-Access Stratum ("NAS") signaling, checking the authorization of UE 12 to camp on a service provider's Public Land Mobile Network ("PLMN"), and enforcing UE roaming restrictions. MME 20 serves as the termination point in the network for ciphering/integrity protection for NAS signaling and handles the security key management. Lawful interception of signaling is also supported by MME 20.

In regard to particular applications involving UE 12, media servers comprising one or more video servers may be provided, which can provide streaming video to an individual associated with UE 12 via the Internet 14. For example, an individual could be uploading (or streaming) video over the network to which UE 12 is connected. This could involve technologies such as flip video, webcams, YouTube, and various other video technologies involving any type of uploading and/or streaming video data.

For purposes of illustrating certain example techniques of communication system 10, it is important to understand the communications, including control signals, that may be traversing the network and the overload situations that can occur at various points in communication system 10 due to such communications. It will be understood that, after a subscriber data session has been established in a conventional fashion between the UE 12 and the Internet 14, data packets from the UE 12 are encapsulated by the RAN node 17 in accordance with GTPv1-U and forwarded on to SGW 26/PGW 28. The SGW 26/PGW 28 decapsulates the user data packets from GTPv1-U tunnel between the RAN node 17 and the SGW 26/PGW 28 and forwards them to Internet 14. Conversely, data packets intended for the UE 12 are transmitted to the UE from the Internet 14 via the PGW 28/SGW 26, which encapsulates the same in accordance in GTPv1-U tunnel towards the RAN node, and the RAN node 17 decapsulates the data packets upon receipt thereof.

The LTE standard includes a radio access network that employ a technology called evolved universal terrestrial radio access network ("EUTRAN") for communicating UEs and a System Architecture Evolution ("SAE") core network. As part of the EUTRAN, an eNodeB provides a wireless air interface for bridging UEs to the SAE core network over a wired connection. The SAE core network includes management gateways such as the MME, forwarding gateways such as the SGW, and PGWs.

In operation, when UE 12 requests IP services, an IP connectivity access network bearer, or evolved packet switch ("EPS") bearer, is required to provide connectivity from UE 12 to SGW 26 and back, effectively establishing an end-to-end IP path associated with a specific QoS. Parts of the EPS bearer may use IP tunneling. The EPS bearer is similar to a packet data protocol ("PDP") context in the general packet radio service ("GPRS") core network and includes a radio bearer between UE 12 and E-UTRAN 16, an S1 bearer between E-UTRAN 16 and SGW 26, and an S5/S8 bearer between SGW 26 and PGW 28. A generic IP tunnel or IP path may substitute for a bearer in some embodiments.

The EPS bearer includes a data structure maintained by MME 20 and SGW 26, which includes subscriber information and session information for identifying the traffic flow carried by the bearer. When data is delivered from the core network to SGW 26, SGW 26 uses bearer information to direct the incoming packets to the correct UE, such as UE 12. UE 12 likewise attaches bearer information to IP traffic bound for the core network, which SGW 26 uses to maintain IP sessions and direct packets to their destinations. The bearer also carries QoS information that applies to the traffic flow carried by the bearer.

When UE 12 initially attaches to E-UTRAN 16, UE 12 requests IP connectivity, and a bearer may be allocated by MME 20 and SGW 26 for providing IP services. The bearer is created, allocated, and tracked by MME 20 so that when UE 12 moves from one RAN to another, it can maintain the same bearer at MME 20. Data is sent via the bearer in conjunction with a S1-U tunnel from SGW 26 to attached RAN node 17. If UE 12 goes idle, RAN node 17 and SGW 26 are permitted to deallocate radio resources.

Downlink data paging is the process by which an inactive, or idle, UE is contacted to receive data from an upstream source over the packet data network. A UE that is in an active state is associated with an eNodeB and has at least one active bearer. When the UE goes inactive, such as when it enters a low power mode, it releases all bearers. To locate an inactive UE, MME 20 issues paging requests to multiple eNodeBs, which is typically an expensive operation.

When data arrives at SGW 26 for UE 12, SGW may inform the relevant MME, in this case, MME 20, that data has arrived using a downlink data notification (DDN) message. Subsequently, MME 20 may page inactive UE 12 and, if requested by UE 12, reestablish an S1-U tunnel from SGW 26 to eNodeB 17 by triggering a Modify Bearer Request (MBRq) message toward SGW. The data may then be requested by UE 12 and retrieved from SGW 26 over the preexisting bearer. A DDN message need not be sent by SGW 26 to MME 20 every time new downstream data is received at SGW 26. Instead, once a DDN message is sent, SGW 26 typically does not send another DDN but instead waits for MME 20 to respond with a message indicating that the DDN message has been received. This message may be a MBRq message or a DDN Acknowledgement (ACK) message. Once the DDN message has been acknowledged, SGW 26 does not need to send additional DDN messages until a delay value timer has expired, indicating that a new DDN message should be sent. The delay value timer has a value which may be provided by MME 20 in a DDN ACK message, as described below, and which may be specific to UE 12 or to the particular packet data network that is the source of the incoming traffic.

In situations in which MME 20 is overloaded, MME may not receive DDN messages from SGW 26, which may also be overloaded; it may not page all the UEs for which it has received DDN messages; and/or it may fail to respond to SGW with DDN ACK messages. MME 20 may also become unable to page a UE during emergency events with the appropriate messages, e.g., Emergency Calls or Amber Alerts. Clearly, therefore, it is undesirable to permit overloading of an MME. In some embodiments, LTE and the GPRS tunneling protocol ("GTP"), which incorporate a QoS model for EPS bearers. Each EPS bearer is associated with and identified by bearer level QoS parameters, including a QoS Class Identifier ("QCI") and Allocation and Retention Priority ("ARP"). The QCI is a scalar that is used as a reference to access node-specific parameters that control bearer level packet forwarding treatment, such as scheduling weights, admission thresholds, queue management thresholds, link layer protocol configuration, for example, and that have been preconfigured by the operator that owns the access node (e.g., eNodeB).

The ARP contains information about priority level (in the form of a scalar), preemption capability (in the form of a flag), and preemption vulnerability (in the form of a flag) of the bearer. The primary purpose of the ARP is to determine whether a bearer establishment/modification request can be accepted or needs to be rejected in case of resource limitations, such as available radio capacity, in the case of guaranteed bit rate ("GBR") bearers. The priority level information of the ARP is used for this decision to ensure that the request of the bearer with the higher priority is preferred. Additionally, the ARP can be used (e.g., by the eNodeB) to determine which bearer(s) to drop during periods of exceptional resource limitation (e.g., at handover). The preemption capability information of the ARP is used to decide whether a bearer with a lower ARP priority level should be dropped to free up the required resources. The preemption vulnerability information of the ARP is used to decide whether a bearer is a candidate for such dropping by a preemption capable bearer with a higher ARP priority value. Once successfully established, a bearer's ARP does not have any impact on the bearer level packet forwarding treatment (e.g., scheduling and rate control), which is determined solely by the other EPS bearer QoS parameters, including QCI, GBR, and maximum bit rate ("MBR"), and by the aggregate MBR ("AMBR") parameters. The ARP is not included within the EPS QoS Profile sent to the UE.

In one embodiment, the value of the ARP priority level may be in a range of integers 1-15 and may be implemented to include a bearer priority value, with a value of 1 corresponding to the highest priority and a value of 15 corresponding to the lowest priority. For messaging from the MME to the SGW, the ARP may be included as a parameter in the DDN ACK message. In some embodiments, if a bearer priority is not provided by the MME, a default bearer priority will be applied.

It will be recognized, that, as provided for in "LTE: General Packet Radio Service (GPRS) enhancements for Evolved Universal Terrestrial Radio Access Network (E-UTRAN) access (3GPP TS 23.401 version 10.8.0 Release 10)," under certain circumstances, such as when MME load or eNodeB load exceeds an operator configured threshold, as will be described, an MME may be configured to restrict the signaling load that SGW is imposing on it via DDNs. For example, the MME can reject DDN requests for low priority traffic for UEs in idle mode. To further offload the MME, the MME can request SGW selectively to reduce the number of DDN requests it sends for low priority downlink traffic received for UEs in idle mode according to a throttling factor ("TF") for a period of time designated a throttling delay ("TD"). The TF and TD are specified in a DDN ACK message from MME to SGW.

The SGW determines whether or not a bearer is for low priority traffic based on the bearer's ARP priority level and operator policy, which is the operator's configuration in the SGW of the ARP levels to be considered priority versus non-priority traffic. The MME determines whether a DDN is for low priority traffic based on the ARP priority level received from the SGW, as well as operator policy. If idle-mode signaling reduction ("ISR") is not active for the UE, during a throttling delay, the SGW will drop downlink packets received on all its low priority bearers for UEs known as not user plane connected (i.e., those UEs for which the SGW context data indicates no downlink user plane TEID) served by the MME in proportion to the throttling factor and sends a DDN message to the MME only for non-throttled bearers. If ISR is active for a UE, during the throttling delay, the SGW does not send a DDN to the MME and only sends a DDN to the SGSN. If both the MME and SGSN are requesting load reduction, the SGW drops downlink packets received on all its low priority bearers for UEs known as not user plane connected in proportion to the respective throttling factors. The SGW resumes normal operation at the expiry of the throttling delay. The last received value of the TF and TD supersedes any previously received values.

For example, if the configured low ARP priority value (or the ARP watermark) is 10, all bearers with an ARP value ranging from 10 to 15 are subjected to DDN throttling. If the MME sends a DDN ACK with a TF of 50% and a TD of 180 seconds, 50% of DDN requests originating at the SGW for bearers with a priority greater than or equal to 10 (i.e., ARP=10-15) would be dropped for the next 180 seconds. It should be noted that, while the described system does provide some means by which the MME can regulate paging during overload conditions, the system only allows for throttling of low ARP priority bearers; moreover, it requires ARP priority watermark configuration. Accordingly, there are situations in which the system would not prevent an overload situation from occurring.

One such situation may be illustrated as follows. Assume that an SGW is handling four million subscribers, each of which has a default bearer, and that the ARP value for default bearers is 5. Assume further that, of the four million subscribers, twenty thousand are in an idle state and of those, data packets arrive within a common timeframe for half, or ten thousand, of the twenty thousand idle subscribers. In this case, the SGW would have to initiate paging for ten thousand subscribers and if the ARP watermark is 10, none of the ten thousand DDNs would be throttled at the SGW, resulting in a potential overload of the MME. As the immediately preceding example illustrates, there is a need to provide additional DDN throttling for all bearers and which throttling is not dependent on ARP watermark configuration.

Figure 2:
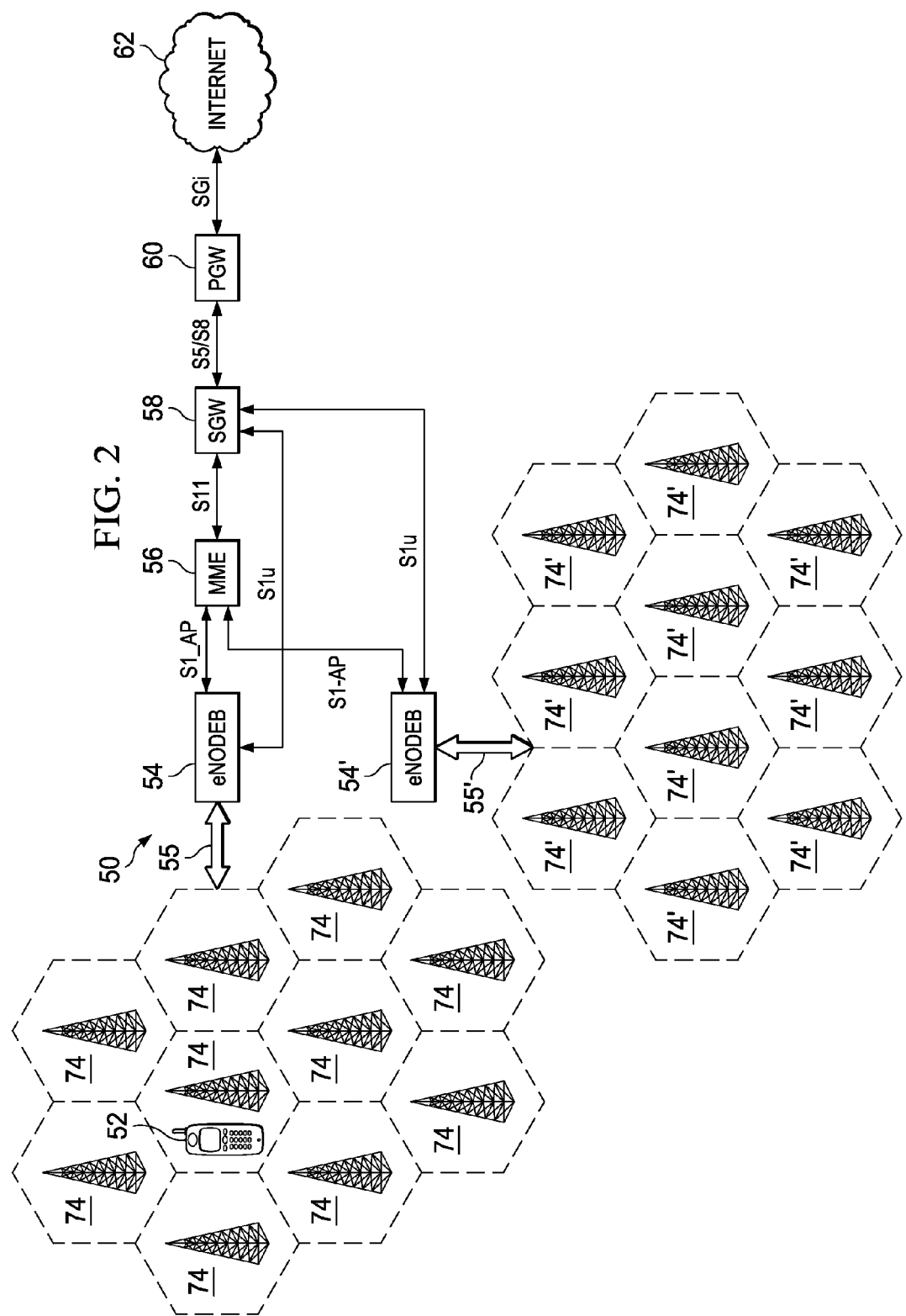
FIGS. 2 and 3 illustrate a more simplified block diagram of a communication system similar to the communication system shown in FIG. 1 illustrating a method of throttling downlink data notifications in a network environment in accordance with an embodiment of the present disclosure.
Figure 3:
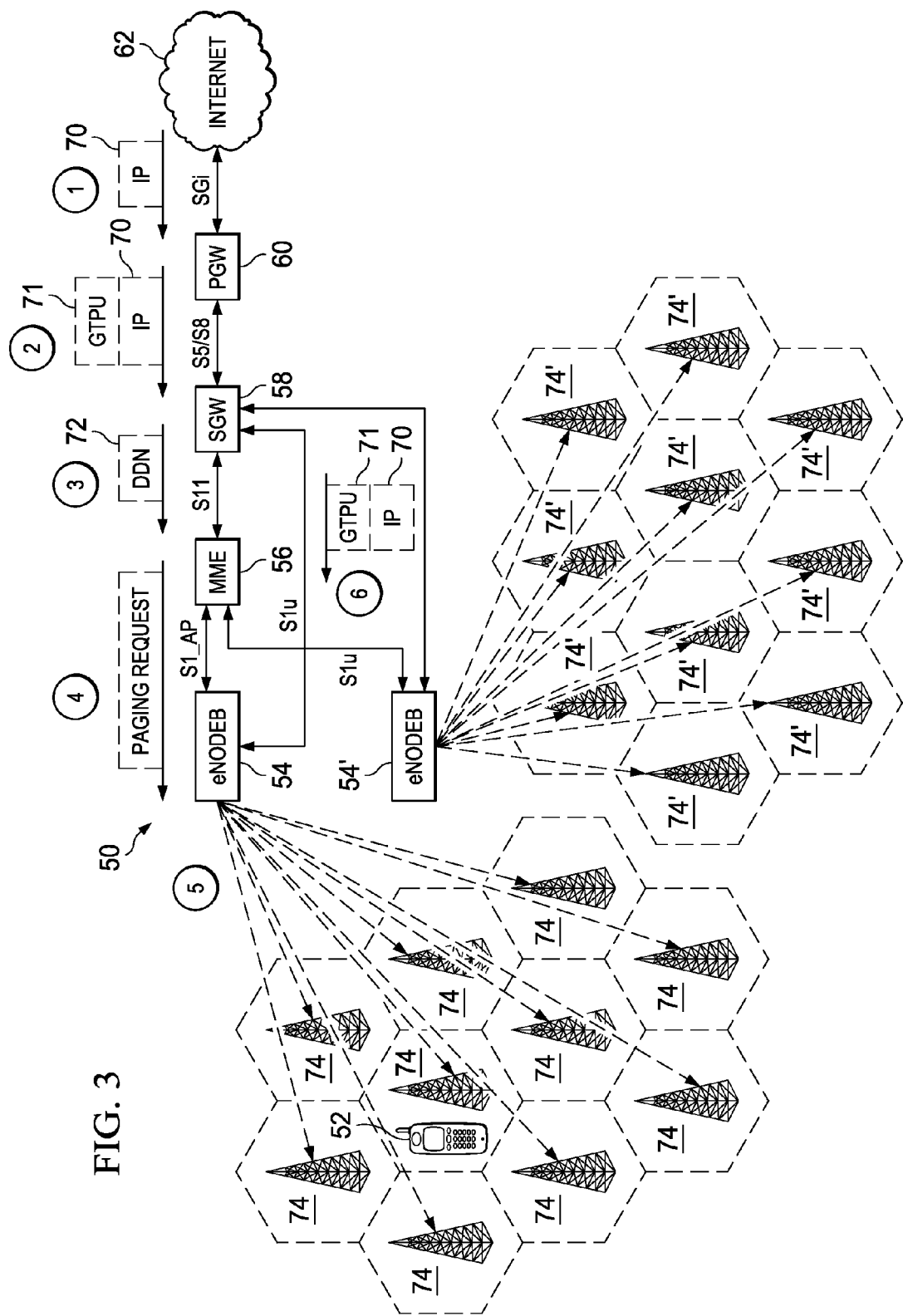

Referring now to FIGS. 2 and 3, illustrated therein is a simplified block diagram of a system 50, which is similar to communication system 10 in many respects. As shown in FIG. 2, the system 50 includes UE 52 which may be connected to one of a plurality of eNodeBs, represented in FIGS. 2 and 3 by eNodeBs 54, 54', over a wireless air interface, represented in FIG. 2 by an arrows 55, 55'. An MME 56 communicates with each of the eNodeBs 54, 54', via an S1-MME interface using an S1-Ap protocol. A control path is provided between MME 56 and an SGW 58 via an S11 interface. A data path for uplink and downlink packets is provided between each of the eNodeBs 54, 54', and SGW 58 via an S1-U interface. Data and control paths are provided between SGW 58 and a PGW 60 via an S5/S8 interface. A SGi interface is provided between PGW 60 and an IP network 62.

In some embodiments, SGW 58 and PGW 60 may be implemented on the same network device. In the illustrated embodiment, the SAE core network comprises an Evolved Packet Core ("EPC"), which includes MME 56, SGW 58, and PGW 60. As previously noted, UE 52 can be associated with clients, customers, or end users wishing to initiate a communication in communication system 50 via some network. The term 'user equipment' is inclusive of devices used to initiate a communication, such as a computer, a personal digital assistant ("PDA"), a laptop or electronic notebook, a cellular telephone, an iPhone, an IP phone, or any other device, component, element, or object capable of initiating voice, audio, video, media, or data exchanges within communication system 50. UE 52 may also be inclusive of a suitable interface to the human user, such as a microphone, a display, or a keyboard or other terminal equipment. UE 52 may also be any device that seeks to initiate a communication on behalf of another entity or element, such as a program, a database, or any other component, device, element, or object capable of initiating an exchange within communication system 50. Data, as used herein in this document, refers to any type of numeric, voice, video, media, or script data, or any type of source or object code, or any other suitable information in any appropriate format that may be communicated from one point to another. On power up, UE 52 can be configured to initiate a request for a connection with a service provider. A user agreement can be authenticated by the service provider based on various service provider credentials (e.g., subscriber identity module ("SIM"), Universal SIM ("USIM"), certifications, etc.). More specifically, a device can be authenticated by the service provider using some predetermined financial relationship.

As has been noted, MME 56 is a control node for the LTE access network. MME 56 is responsible for UE tracking and paging procedures including retransmissions. MME 56 handles the bearer activation/deactivation process and is also responsible for choosing SGW 58 for UE 52 at the initial attach and at time of an intra-LTE handover. As shown in FIG.

3, when data packets, represented by a packet 70, destined for UE 52 are routed from the Internet 62 to PGW 60 (step 1). PGW 60 routes the packet to SGW 58 (step 2) by encapsulating the data packet 70 under a GTPU header 71. SGW 58 routes and forwards user data packets, while also acting as a mobility anchor for the user plane during inter-eNodeB handovers, and as an anchor for mobility between LTE and other 3GPP technologies. For a UE in an idle state, SGW 58 receives downlink data for that UE, buffers or drops the received data, and triggers paging. Once S1-U tunnels are established, buffered data is forwarded from SGW 58 to the UE As mentioned above, UE 52 may be in an active or an idle state. Whether UE 52 is in an active state may depend on the state of a packet data session involving UE and whether there is an active packet data session. The idle state is a sleep mode state that can be used to conserve battery life of UE by minimizing the need to power receivers to be ready for radio signals. The UE also releases eNodeB radio sources when in idle mode so that those radio resources can be utilized by another UE. When UE 52 is in an idle state, SGW 58 buffers IP packets received for UE and initiates paging request towards MME 56 with a DDN 72 (step 3). Upon receipt of the DDN, MME 56 initiates a paging request procedure, sending a paging request to one or more eNodeBs (step 4). The eNodeBs in turn initiate a paging request procedure in their respective cells to locate the UE (step 5). Each of the cells 74, 74' then broadcasts a paging indicator for UE 52. Paging indicators are usually broadcast from a number of cells because UE 52 may move while in an idle state. If UE 52 responds to the page, SGW 58 forwards the IP packet 70 encapsulated under the GTPU header 71 to eNodeB 54 via an S1-U data link for delivery to UE 52 (step 6). It will be recognized that MME 56 handles control plane traffic, including paging traffic, for several UEs in addition to UE 52; as a result, excessive paging may cause MME 56 and eNodeBs 54, 54', to become overloaded.

Figure 4:
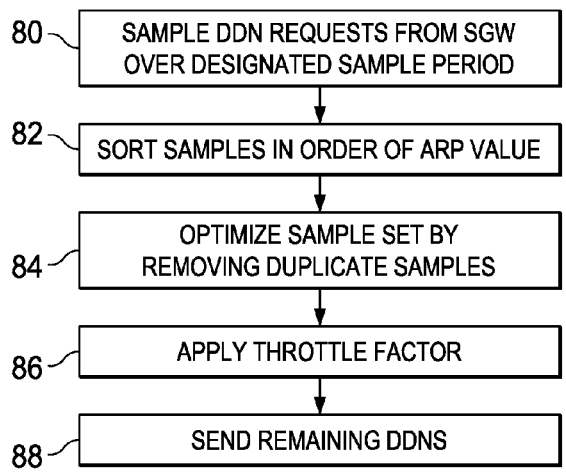
FIG. 4 is a flowchart illustrating activities associated with throttling DDN messages in a network environment in accordance with an embodiment of the present disclosure.

FIG. 4 illustrates a flowchart of logic executed at SGW 26 (using the processor 30, memory 32, and module 34) for throttling DDN messages in a network environment, such as communication system 10, accordance with embodiments described herein. The flow illustrated in FIG. 4 is periodically performed at a pre-selected or programmable time interval, the length of which may vary depending on applications thereof.

Figure 5:
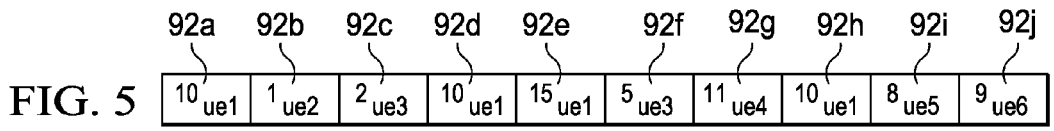
FIGS. 5-8 illustrate example throttling DDN messages in a network environment in accordance with an embodiment of the present disclosure.

Referring now to FIG. 4, in step 80, DDN initiation requests are sampled at SGW 58 at regular time intervals or in response to an indication of imminent overload at MME 56 over a configured sampling period to create an initial sample set. For example, as illustrated in FIG. 5, the initial sample set comprises ten DDN initiation requests 92a-92j sampled over a designated sampling period. The initiation request 92a is associated with a bearer having an ARP value of 10 and associated with a user ue1. The initiation request 92b is associated with a bearer having an ARP value of 1 and associated with a user ue2. The initiation request 92c is associated with a bearer having an ARP value of 2 and associated with a user ue3. The initiation request 92d is associated with a bearer having an ARP value of 10 and associated with a user ue1. The initiation request 92e is associated with a bearer having an ARP value of 15 and associated with a user ue1. The initiation request 92f is associated with a bearer having an ARP value of 5 and associated with a user ue3. The initiation request 92g is associated with a bearer having an ARP value of 11 and associated with a user ue4. The initiation request 92h is associated with a bearer having an ARP value of 10 and associated with a user ue1. The initiation request 92i is associated with a bearer having an ARP value of 8 and associated with a user ue5. The initiation request 92j is associated with a bearer having an ARP value of 9 and associated with a user ue6.

It will be noted that there may be multiple DDN initiation requests associated with different bearers for the same user. Typically, each such bearer will have a different ARP values, due to different types of traffic associated with the bearer. For example, a DDN initiation request associated with bearer traffic of a user comprising video data will likely have an ARP with a low value (corresponding to a high priority), whereas a DDN initiation request associated with bearer traffic of a user comprising email data will likely have an ARP with a high value (corresponding to a low priority).

Figure 6:
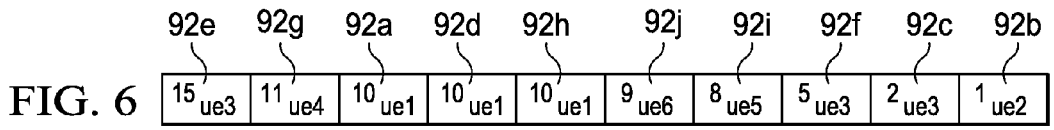

Referring again to FIG. 4, in step 82, the sampled initiation requests 92a-92j comprising the initial sample set are sorted in order of ARP value to create a prioritized sample set. For example, as shown in FIG. 6, the initiation request 92e, associated with user ue3, has the highest ARP value and therefore the lowest priority, while the initiation request 92b, associated with user ue2, has the lowest ARP value and hence the highest priority. As shown in FIG. 6, the sampled initiation requests are arranged in order of highest to lowest ARP value (and lowest to highest priority) as follows:

92e, 92g, 92a, 92d, 92h, 92j, 92i, 92f, 92c, 92b

Figure 7:
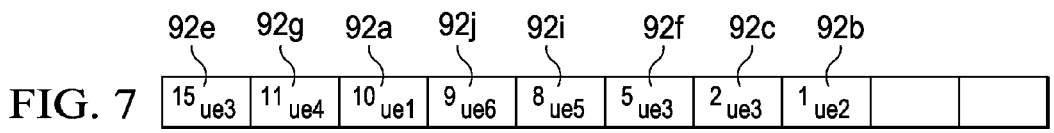

Alternatively, the sampled initiation requests may be arranged in order of lowest to highest ARP value (and highest to lowest priority). Referring again to FIG. 4, in step 84, the prioritized sample set is optimized by removing duplicate DDN initiation requests from the prioritized sample set to create an optimized sample set. For example, as illustrated in FIG. 7, three of the sampled initiation requests (specifically, requests 92a, 92d, and 92h) associated with the same user (ue1) have the same ARP value (10). Clearly, there is no need to page the same UE multiple times, as paging the UE for one of the bearers results in bearer establishment and formation of S1-U tunnels for all of the bearers; therefore, all but one of the initiation requests is removed from the prioritized sample set. In the embodiment illustrated in FIG. 7, the initiation requests 92d and 92h are removed; the initiation request 92a remains in the optimized sample set.

Figure 8:
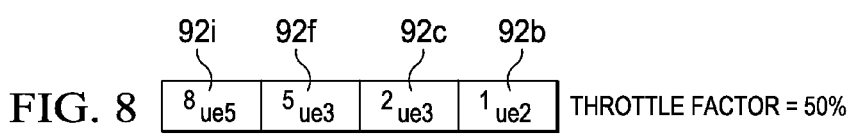

Referring again to FIG. 4, in step 86, the throttle factor ("TF") is applied to the initiation requests that remain in the optimized sample set, as described with reference to step 84 and illustrated in FIG. 7, to create a final DDN set. For example, as illustrated in FIG. 8, assuming the TF is equal to 50%, after the TF is applied to the optimized sample set of FIG. 7, the 50% of the initiation requests having the lowest priority/highest ARP value, are removed. As a result, the remaining initiation requests, which comprise the final DDN set, as shown in FIG. 8, are requests 92i, 92f, 92c, and 92b. Referring again to FIG. 4, in step 88, the DDN initiation requests comprising the final DDN set are sent. Using the example illustrated in FIGS. 5-8, the DDN initiation requests 92i, 92f, 92c, and 92b are sent.

Using the techniques described hereinabove, and especially with reference to FIGS. 4-8, DDN initiation requests associated with high ARP priority bearers (i.e., bearers with low ARP values) may be throttled. This is not the case with other techniques, in which DDN initiation requests associated with bearers having an ARP lower than a certain watermark are never throttled. Additionally, the techniques described herein do not require configuration of an ARP priority watermark. The importance of these distinctions can be illustrated in the example provided above and repeated below for emphasis.

Assuming that an SGW handles four million subscribers, each with a default bearer; that the ARP value for default bearer is 5; that of the four million subscribers, twenty thousand subscribers are in an idle state. Assuming further data packets arrive for half of the twenty thousand idle subscribers at a given time, the SGW would have to initiate paging for ten thousand subscribers. If the ARP watermark for DDN throttling is ten, none of the ten thousand DDN initiation request would be throttled at the SGW, potentially overloading the MME.

In contrast, using the techniques described herein and assuming a throttle factor of 50%, at least half of the ten thousand, or five thousand, of the DDN initiation requests would be throttled at the SGW, resulting significant relief in the burden on the MME and eNodeBs.

Note that in certain example implementations, the DDN throttling functions outlined herein may be implemented by logic encoded in one or more non-transitory, tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element, as shown in FIG. 1, can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor, as shown in FIG. 1, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

In one example implementation, SGW 26 includes software in order to achieve the DDN throttling functions outlined herein. These activities can be facilitated by module 34. SGW 26 can include memory elements for storing information to be used in achieving DDN throttling as outlined herein. Additionally, SGW 26 may include a processor that can execute software or an algorithm to perform the DDN throttling activities as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

In a separate endeavor, communication system 10 can generally be configured or arranged to represent the LTE architecture, the 3G architecture applicable to UMTS environments, or any suitable networking system or arrangement that provides a communicative platform for communication system 10. In other examples, FIG. 1 could readily include an SGSN, a gateway GPRS support node (GGSN), any type of network access server, network node, etc. Moreover, the present disclosure is equally applicable to other cellular and/ or wireless technology including CDMA, Wi-Fi, WiMax, etc.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain backhaul links, AAA, and authentication protocols, communication system 10 may be applicable to other exchanges, routing protocols, authentication protocols, or routed protocols in which packets (not necessarily the routing protocol/packets described) are exchanged in order to provide RAN congestion level indication for user plane traffic activities. In addition, other example environments that could use the features defined herein include Pico architectures, where appropriate DDN throttling could occur for UE 12.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
creating an initial sample set comprising a plurality of notification messages comprising downlink data notification ("DDN") messages initiated by a first network element, wherein each of the notification messages is associated with one of a plurality of bearers each of which has a first parameter associated therewith;
prioritizing the notification messages of the initial sample set according to a value of the first parameter of the associated bearer to create a prioritized sample set;
optimizing the prioritized sample set to create an optimized sample set; and
applying a throttle factor to the optimized sample to remove a number of low priority notification messages from the prioritized sample set to create a final set of notification messages to be transmitted to a second network element, wherein the number of low priority notification messages removed from the prioritized sample set is indicated by the throttle factor.

2. The method of claim 1, wherein the creating comprises sampling notification messages initiated by the first network element during a predetermined time frame in response to an indication of imminent overload at the second network element.

3. The method of claim 1, wherein the first parameter comprises an Allocation and Retention Priority ("ARP") priority level.

4. The method of claim 1, wherein the optimizing comprises eliminating duplicate notification messages such that the optimized sample set contains no more than one notification message for each of the bearers.

5. The method of claim 1, wherein the prioritizing comprises arranging the notification messages in order of associated ARP priority level value.

6. The method of claim 1, wherein the first network element comprises a serving gateway and the second network element comprises a mobility management entity.

7. Logic encoded in one or more non-transitory tangible media that includes code for execution and when executed by a processor is operable to perform operations comprising:
creating an initial sample set comprising a plurality of notification messages comprising downlink data notification ("DDN") messages initiated by a first network element, wherein each of the notification messages is associated with one of a plurality of bearers each of which has a first parameter associated therewith;
prioritizing the notification messages of the initial sample set according to a value of the first parameter of the associated bearer to create a prioritized sample set;
optimizing the prioritized sample set to create an optimized sample set; and
applying a throttle factor to the optimized sample to remove a number of low priority notification messages from the prioritized sample set to create a final set of notification messages to be transmitted to a second network element, wherein the number of low priority notification messages removed from the prioritized sample set is indicated by the throttle factor.

8. The logic of claim 7, wherein the creating comprises sampling notification messages initiated by the first network element during a predetermined time frame in response to an indication of imminent overload at the second network element.

9. The logic of claim 7, wherein the first parameter comprises an Allocation and Retention Priority ("ARP") priority level.

10. The logic of claim 7, wherein the optimizing comprises eliminating duplicate notification messages such that the optimized sample set contains no more than one notification message for each of the bearers.

11. The logic of claim 7, wherein the prioritizing comprises arranging the notification messages in order of associated ARP priority level value.

12. The logic of claim 7, wherein the first network element comprises a serving gateway and the second network element comprises a mobility management entity.

13. An apparatus comprising:
a memory element operable to store data;
a processor operable to execute instructions associated with the data; and
a throttling module operable to interact with the processor such that the apparatus is configured to:
create an initial sample set comprising a plurality of notification messages comprising downlink data notification ("DDN") messages initiated by a first network element, wherein each of the notification messages is associated with one of a plurality of bearers each of which has a first parameter associated therewith;
prioritize the notification messages of the initial sample set according to a value of the first parameter of the associated bearer to create a prioritized sample set;
optimize the prioritized sample set to create an optimized sample set; and
apply a throttle factor to the optimized sample to remove a number of low priority notification messages from the prioritized sample set to create a final set of notification messages to be transmitted to a second network element, wherein the number of low priority notification messages removed from the prioritized sample set is indicated by the throttle factor.

14. The apparatus of claim 13, wherein the apparatus is further configured to:
sample notification messages initiated during a predetermined time frame in response to an indication of imminent overload at a network element.

15. The apparatus of claim 13, wherein the first parameter comprises an Allocation and Retention Priority ("ARP") priority level.

16. The apparatus of claim 13, wherein the apparatus is further configured to:
eliminate duplicate notification messages such that the optimized sample set contains no more than one notification message for each of the bearers.

17. The apparatus of claim 13, wherein the apparatus is further configured to:
arrange the notification messages in order of associated ARP priority level value.

18. The apparatus of claim 13, wherein the apparatus is configured to interact with a serving gateway and a mobility management entity.

* * * * *